(12) United States Patent
Terai et al.

(10) Patent No.: US 12,280,793 B2
(45) Date of Patent: Apr. 22, 2025

(54) INFORMATION PROCESSING APPARATUS AND INFORMATION PROCESSING METHOD

(71) Applicant: Panasonic Intellectual Property Management Co., Ltd., Osaka (JP)

(72) Inventors: Haruko Terai, Osaka (JP); Akira Matsubara, Osaka (JP); Gentaro Takeda, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 46 days.

(21) Appl. No.: 18/218,653

(22) Filed: Jul. 6, 2023

(65) Prior Publication Data

US 2024/0067206 A1 Feb. 29, 2024

(30) Foreign Application Priority Data

Jul. 8, 2022 (JP) .................. 2022-110554

(51) Int. Cl.
| | |
|---|---|
| G08G 1/16 | (2006.01) |
| B60W 30/06 | (2006.01) |
| B60W 30/14 | (2006.01) |
| B60W 50/16 | (2020.01) |
| B60W 50/14 | (2020.01) |

(52) U.S. Cl.
CPC ............ B60W 50/16 (2013.01); B60W 30/06 (2013.01); B60W 30/146 (2013.01); G08G 1/168 (2013.01); *B60W 2050/143* (2013.01); *B60W 2050/146* (2013.01); *B60W 2556/10* (2020.02)

(58) Field of Classification Search
CPC .... B60W 50/16; B60W 30/06; B60W 30/146; B60W 2050/143; B60W 2050/146; B60W 2556/10; G08G 1/168; B62D 15/0285
See application file for complete search history.

(56) References Cited

U.S. PATENT DOCUMENTS

| | | | |
|---|---|---|---|
| 2016/0272244 A1 | 9/2016 | Imai et al. | |
| 2018/0093663 A1* | 4/2018 | Kim ...................... | G08G 1/166 |
| 2019/0118801 A1* | 4/2019 | Noh .................... | B60W 30/095 |
| 2019/0227154 A1* | 7/2019 | Viswanathan .......... | G01S 15/93 |
| 2020/0070814 A1* | 3/2020 | Park ................... | B62D 15/0285 |
| 2020/0142400 A1* | 5/2020 | Kuwabara ............... | B60R 21/00 |
| 2021/0233408 A1* | 7/2021 | Swan ...................... | G08G 1/04 |
| 2021/0370919 A1* | 12/2021 | Kusuhara ............. | B62D 15/027 |
| 2022/0066003 A1* | 3/2022 | Vitanov .................. | G01S 7/497 |

FOREIGN PATENT DOCUMENTS

WO 2015/060354 4/2015

* cited by examiner

*Primary Examiner* — Nay Tun
(74) *Attorney, Agent, or Firm* — Greenblum & Bernstein, P.L.C.

(57) ABSTRACT

An information processing apparatus includes: a storage that stores first detection object information; and a processor that acquires second detection object information, in which the processor determines whether an undetected object that has not been detected in the first parking is present, based on the first detection object information and the second detection object information, and changes an aspect of the notification when the undetected object is present.

22 Claims, 6 Drawing Sheets

INFORMATION PROCESSING APPARATUS AND INFORMATION PROCESSING METHOD

TECHNICAL FIELD

The present disclosure relates to an information processing apparatus and an information processing method.

BACKGROUND ART

In the conventional technique, an apparatus has been known, which calls for attention (hereinafter, sometimes referred to as attention calling) from a user (e.g., occupant) of a vehicle when an object is present around a parking space in which the vehicle is about to be parked.

CITATION LIST

Patent Literature

PTL 1
  WO2015/060354

SUMMARY OF INVENTION

Solution to Problem

An information processing apparatus according to an embodiment of the present disclosure is an information processing apparatus that performs notification to a user of a vehicle when an object is present around a parking space, and includes: a storage that stores first detection object information around the parking space in a first parking; and a processor that acquires second detection object information around the parking space in a second parking performed after the first parking, in which the processor determines whether an undetected object that has not been detected in the first parking is present, based on the first detection object information and the second detection object information, and changes an aspect of the notification when the undetected object is present.

An information processing apparatus according to an embodiment of the present disclosure is an information processing apparatus that communicates with a mobile terminal that performs notification to a user of a vehicle when an object is present around a parking space, and includes: a storage that stores first detection object information around the parking space in a first parking; and a processor that acquires second detection object information around the parking space in a second parking performed after the first parking, in which the processor determines whether an undetected object that has not been detected in the first parking is present, based on the first detection object information and the second detection object information, and transmits, to the mobile terminal, change information for changing an aspect of the notification in the mobile terminal, when the undetected object is present.

An information processing method according to an embodiment of the present disclosure is an information processing method executed by an apparatus that performs notification to a user of a vehicle when an object is present around a parking space, and includes: storing first detection object information around the parking space in a first parking; acquiring second detection object information around the parking space in a second parking performed after the first parking; determining whether an undetected object that has not been detected in the first parking is present, based on the first detection object information and the second detection object information; and changing an aspect of the notification when the undetected object is present.

An information processing method according to an embodiment of the present disclosure is an information processing method executed by an apparatus that communicates with a mobile terminal that performs notification to a user of a vehicle when an object is present around a parking space, and includes: storing first detection object information around the parking space in a first parking; acquiring second detection object information around the parking space in a second parking performed after the first parking; determining whether an undetected object that has not been detected in the first parking is present, based on the first detection object information and the second detection object information; and transmitting, to the mobile terminal, information for changing an aspect of the notification in the mobile terminal, when the undetected object is present.

Advantageous Effects of Invention

According to the present disclosure, it is possible to provide an information processing apparatus and an information processing method that each further enhance a notification to a user when a vehicle is parked.

DESCRIPTION OF EMBODIMENTS

Hereinafter, Embodiments 1 and 2 of the present disclosure will be described in detail with reference to the drawings.

Embodiment 1

Figure 1:
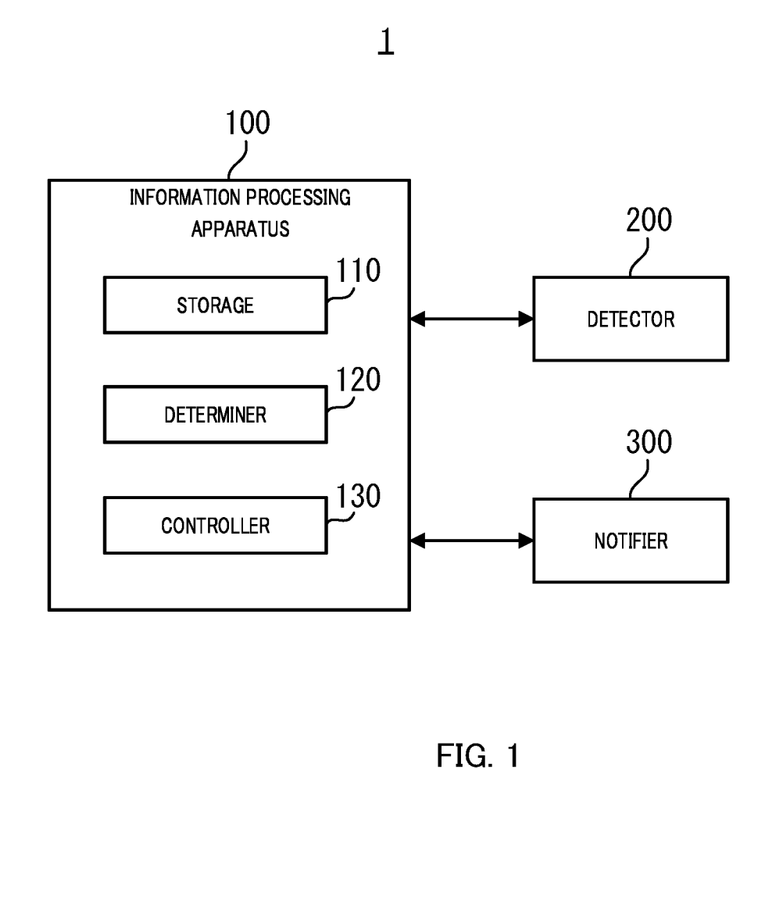
FIG. 1 is a block diagram illustrating an exemplary configuration of an information processing apparatus and a vehicle according to Embodiment 1 of the present disclosure.

First, an exemplary configuration of information processing apparatus 100 and vehicle 1 according to Embodiment 1 will be described with reference to FIG. 1. FIG. 1 is a block diagram illustrating an exemplary configuration of information processing apparatus 100 and vehicle 1 according to Embodiment 1.

Vehicle 1 illustrated in FIG. 1 is, for example, an automobile with a function of automatic parking assistance (so-called home zone parking assistance or assist) capable of automatically parking in a predetermined parking space. Note that, in FIG. 1, illustration of components for realizing the function of the automatic parking assistance is omitted.

For example, vehicle 1 automatically travels from a predetermined position around the parking space to the parking space based on a preset route (e.g., a route learned based on manual driving), and parks.

In the present embodiment, the parking space is assumed to be a space in which vehicle 1 has been parked in the past and that is registered (set) in advance. Examples of such a parking space include a parking space of a home, car sharing, or the like where vehicle 1 is repeatedly parked. Further, the parking method of vehicle 1 is assumed to be, for example, parking in reverse (also referred to as reverse parking or backward parking). However, the present embodiment is also applicable to a case of parking forward (also referred to as forward parking). Further, in the following embodiments, parking that has been performed in the past is also referred to as the first parking, and parking that is to be performed at the present time is also referred to as the second parking.

As illustrated in FIG. 1, vehicle 1 includes information processing apparatus 100, detector 200, and notifier 300. Information processing apparatus 100 is electrically connected to each of detector 200 and notifier 300.

Detector 200 is an in-vehicle sensor (e.g., a camera, a sonar, an LiDAR, and/or the like) that detects an object around vehicle 1.

For example, detector 200 detects an object around the parking space (e.g., an object present between vehicle 1 and the parking space) when automatic parking of vehicle 1 is performed. Then, detector 200 outputs detection object information indicating a feature (e.g., a size, a shape, a type, and/or the like) and/or a position of the detection object to information processing apparatus 100.

Examples of the detection object include a frame or a wall constituting a partition of the parking space, and a static object such as a utility pole, a tree, or an ornament around the parking space. Further, in the present embodiment, the detection object is assumed to include a human or an animal in addition to the above-described static object. Note that detector 200 may, for example, discriminate between a human and an animal based on a predetermined size or motion, or may discriminate between a human and an animal using another known method.

Notifier 300 is an output device that notifies a user of vehicle 1 (e.g., an occupant of vehicle 1).

For example, when detector 200 detects an object around the parking space in which vehicle 1 is about to be parked, notifier 300 calls for attention (may be referred to as alert) from the user of vehicle 1 under the control of information processing apparatus 100 (controller 130).

In the present embodiment, notifier 300 is assumed to be a speaker of a car navigation system provided in a vehicle cabin. Further, in the present embodiment, the notification is assumed to be output of a predetermined sound (hereinafter, referred to as an alarm).

Information processing apparatus 100 is a computer that controls the notification by notifier 300 based on the detection result by detector 200 when automatic parking of vehicle 1 is performed. For example, information processing apparatus 100 may be realized by a control computer of a car navigation system.

Figure 2:
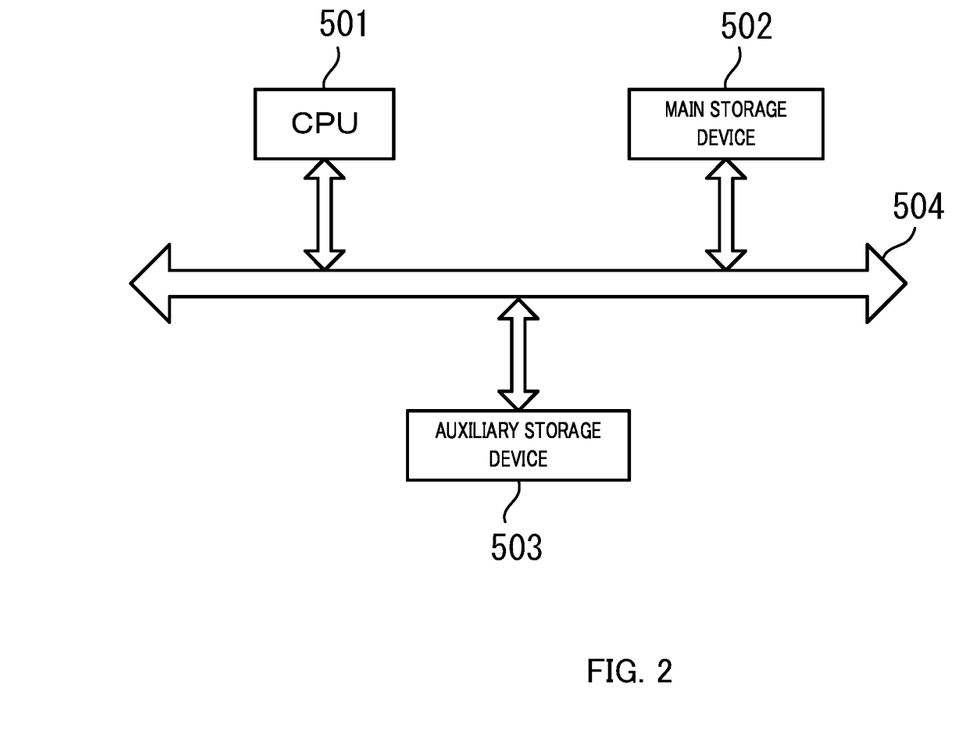
FIG. 2 schematically illustrates an exemplary hardware configuration of a computer included in the information processing apparatus according to Embodiments 1 and 2 of the present disclosure.

As illustrated in FIG. 2, information processing apparatus 100 includes, as hardware, Central Processing Unit (CPU) 501, main storage device 502 such as Read Only Memory (ROM) and Random Access Memory (RAM), auxiliary storage device 503 such as a hard disk and flash memory storing a computer program, and bus 504 connecting them.

The functions of information processing apparatus 100 to be described below are realized by CPU 501 loading the computer program read from auxiliary storage device 503 into RAM of main storage device 50 and executing from there. Note that the computer program may be recorded in a predetermined recording medium and provided to the user or the like.

As illustrated in FIG. 1, information processing apparatus 100 includes storage 110, determiner 120, and controller 130.

Storage 110 stores the detection object information acquired from detector 200.

The detection object information is acquired by detector 200 and stored in storage 110 every time vehicle 1 is parked in the predetermined parking space. Thus, a plurality of pieces of the past detection object information is accumulated as learned information in storage 110.

Determiner 120 determines whether an object that has not been detected in the past and is newly detected at this time (hereinafter, referred to as an "undetected object") is present around the present parking space based on each present and past detection object information. Hereinafter, details will be described.

This determination processing is performed, for example, when vehicle 1 stops at a predetermined position around the parking space and information processing apparatus 100 receives an operation for execution direction of automatic parking (e.g., pressing of a button by the user of vehicle 1).

When the above operation is performed, first, determiner 120 acquires the present detection object information (an example of the second detection object information) from detector 200, and reads the past detection object information (an example of the first detection object information) from storage 110. Note that determiner 120 also corresponds to an example of an acquirer that acquires detection object information (the same applies to Embodiment 2 and Variations to be described later).

Then, determiner 120 classifies the detection object at the present time (e.g., at the time when the operation for execution direction of automatic parking is performed) into either a detected object or an undetected object.

The detected object is an object that has been detected during parking in the past. On the other hand, the undetected object is, as described above, an object that has not been detected during parking in the past and is newly detected at this time.

The above-described classification is performed using, for example, a method of similarity classification of machine learning in which the feature of the object is compared with the feature of the learned detection object. In this case, the undetected object may be referred to as a not-learned object, and the detected object may be referred to as a learned object. Note that the above classification may be performed using another known technique.

When there is at least one undetected object as a result of the classification, determiner 120 determines that an undetected object is present around the parking space. On the other hand, when there is no undetected object, determiner 120 determines that no undetected object is present around the parking space.

Further, when there is at least one undetected object, determiner 120 determines whether the undetected object includes a human or an animal.

Note that since a known technique such as machine learning can be applied to the determination processing herein (the processing for determining the type of the object), a description thereof is omitted.

Controller 130 controls the notification performed by notifier 300.

In the present embodiment, controller 130 controls a level (volume) of the alarm output from notifier 300 in accordance with the determination result by determiner 120. Hereinafter, details will be described.

When determiner 120 determines that no undetected object is present (in other words, when only a detected object is present), controller 130 causes notifier 300 to output an alarm at a low volume (an example of the third aspect).

When determiner 120 determines that an undetected object is present and that the undetected object includes no human or animal, controller 130 causes notifier 300 to output an alarm at a medium volume (an example of the second aspect).

When determiner 120 determines that an undetected object is present and the undetected object includes a human or an animal, controller 130 causes notifier 300 to output an alarm at a high volume (an example of the first aspect).

The volume of the alarm increases in the order of the low volume, the medium volume, and the high volume. Therefore, the degree of the attention calling increases in the order of the low volume, the medium volume, and the high volume. Note that, when determiner 120 determines that no undetected object is present, controller 130 may cause notifier 300 to output an alarm at a volume set by the user, and when determiner 120 determines that an undetected object is present, controller 130 may cause notifier 300 to output an alarm at a volume higher than the volume set by the user.

As described above, in the present embodiment, when determiner 120 determines that an undetected object is present, controller 130 changes the volume of the alarm to be higher.

Note that the alarm may be output before vehicle 1 starts to move toward the parking space, or may be output when the distance between vehicle 1 that is moving toward the parking space and the undetected object is shorter than a predetermined value. However, in the case where an undetected object is present (in the case of the output at a medium volume or a high volume), it is preferred to notify the user earlier in terms of safety, and therefore, it is preferred that the alarm be output before vehicle 1 starts to move.

Further, the present detection object information is stored in storage 110 and used as past detection object information at the time of the next parking.

In addition, when controller 130 changes the volume of the alarm from a medium volume to a high volume, controller 130 changes the volume to a low volume after the parking of vehicle 1 is completed (e.g., at the time of ignition off or at the time of the next ignition on), for example.

The exemplary configuration of information processing apparatus 100 and vehicle 1 according to Embodiment 1 has been described above.

Figure 3:
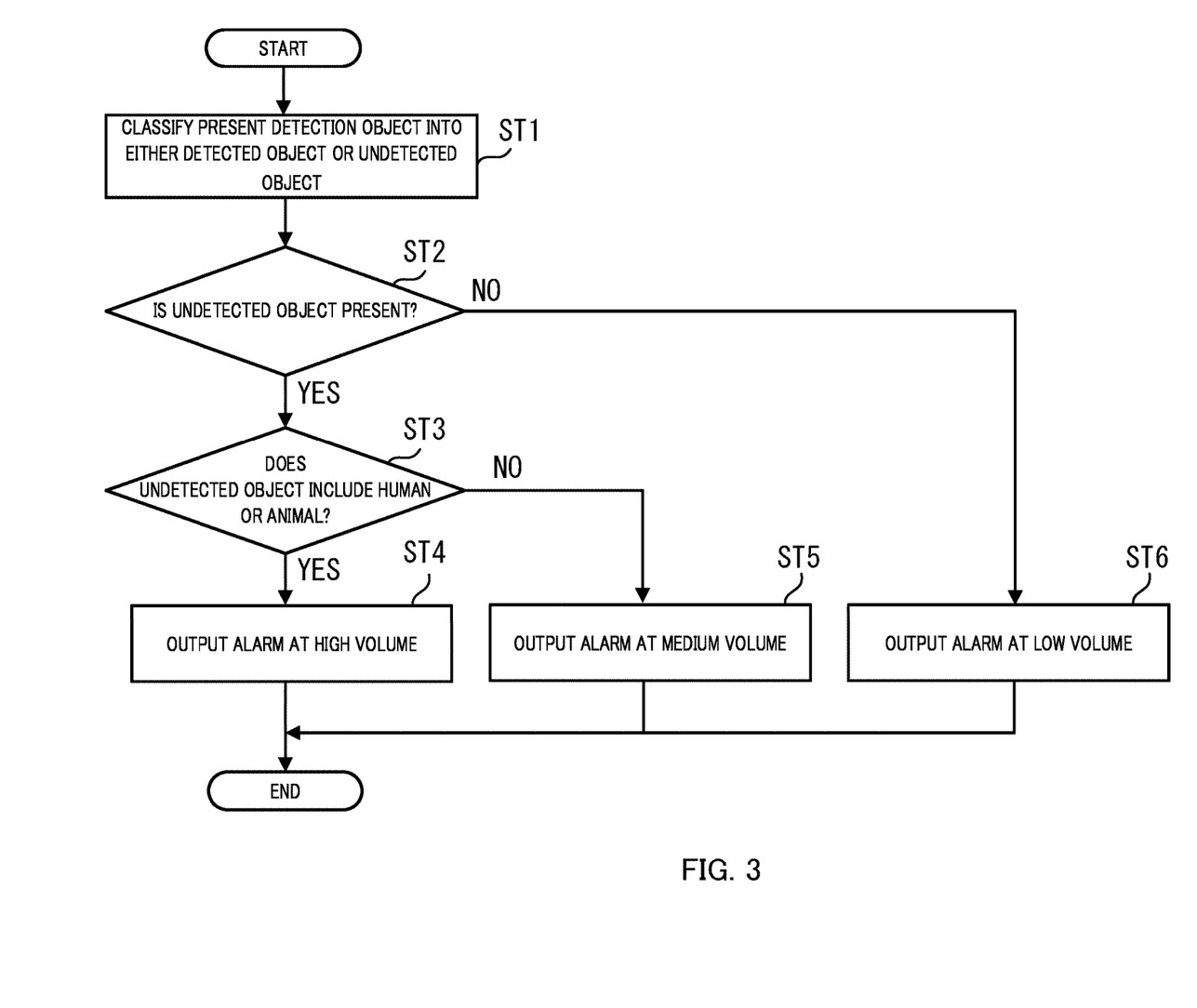
FIG. 3 is a flowchart illustrating an exemplary operation of the information processing apparatus according to Embodiment 1 of the present disclosure.

Next, an exemplary operation of information processing apparatus 100 according to Embodiment 1 will be described with reference to FIG. 3. FIG. 3 is a flowchart illustrating an exemplary operation of information processing apparatus 100 according to Embodiment 1.

The flowchart illustrated in FIG. 3 starts when vehicle 1 is present in a predetermined position around the parking space and an operation for execution direction of automatic parking is performed by the user of vehicle 1.

First, determiner 120 classifies the present detection object into either a detected object or an undetected object based on the present detection object information acquired from detector 200 and the past detection object information read from storage 110 (step ST1).

Next, determiner 120 determines whether an undetected object is present around the parking space based on the classification result (step ST2).

When no undetected object is present around the parking space (step ST2: NO), controller 130 causes notifier 300 to output an alarm at a low volume (step ST6).

When an undetected object is present around the parking space (step ST2: YES), determiner 120 determines whether the undetected object includes a human or an animal (step ST3).

When the undetected object includes a human or an animal (step ST3: YES), controller 130 causes notifier 300 to output an alarm at a high volume (step ST4).

When the undetected object includes no human or animal (step ST3: NO), controller 130 causes notifier 300 to output an alarm at a medium volume (step ST5).

The exemplary operation of information processing apparatus 100 according to Embodiment 1 has been described above.

Embodiment 2

In Embodiment 1, the example has been described in which information processing apparatus 100 is applied to an in-vehicle apparatus (e.g., car navigation system), but information processing apparatus 100 may be applied to a mobile terminal (e.g., a smartphone, a tablet, or the like) used by the user of vehicle 1. For example, the functions of determiner 120 and controller 130 described in Embodiment 1 may be executed in the mobile terminal of the user. The specific example will be described below with reference to FIGS. 4 and 5.

Figure 4:
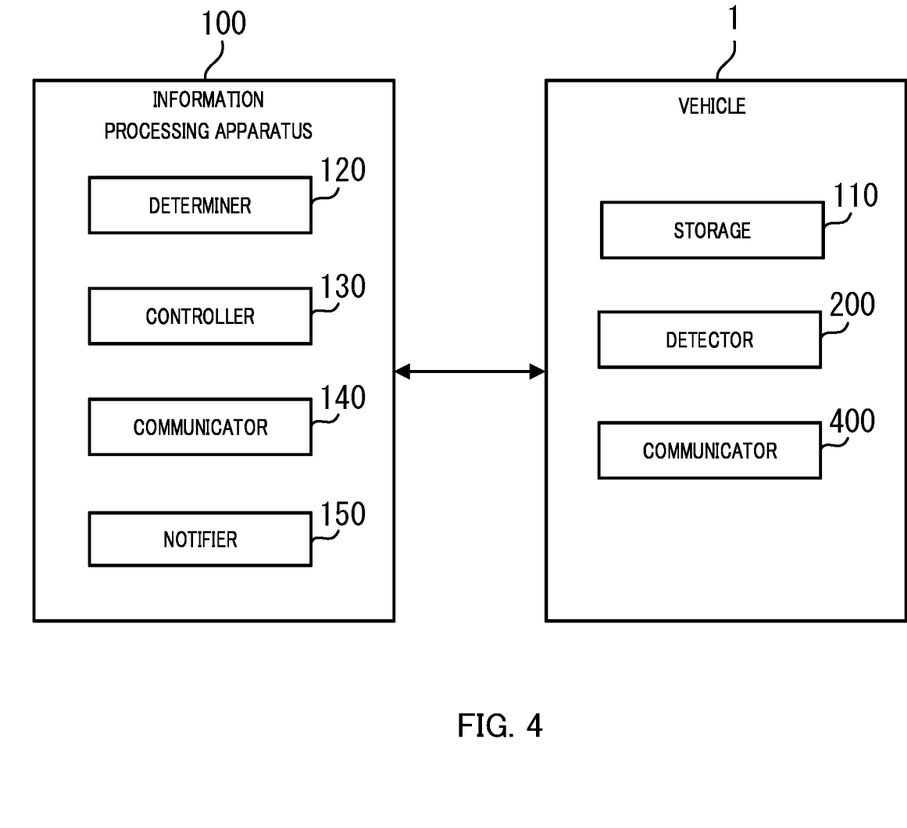
FIG. 4 is a block diagram illustrating an exemplary configuration of an information processing apparatus and a vehicle according to Embodiment 2 of the present disclosure.

First, an exemplary configuration of information processing apparatus 100 and vehicle 1 according to Embodiment 2 will be described with reference to FIG. 4. FIG. 4 is a block diagram illustrating an exemplary configuration of information processing apparatus 100 and vehicle 1 according to Embodiment 2. Note that, in FIG. 4, the same components as those in FIG. 1 are denoted by the same reference numerals. Descriptions of these components are omitted as appropriate.

As illustrated in FIG. 4, vehicle 1 includes storage 110, detector 200, and communicator 400.

Communicator 400 is a communication device performing radio communication with information processing apparatus 100.

Specifically, communicator 400 transmits the present detection object information and the past detection object information to information processing apparatus 100. This transmission is performed, for example, when vehicle 1 starts to be parked in the parking space (more specifically, when an operation for execution direction of automatic parking is performed).

Information processing apparatus 100 is a terminal device that, when automatic parking of vehicle 1 is performed, controls the notification by notifier 150 based on the detection object information received from vehicle 1. For example, information processing apparatus 100 may be realized in a mobile terminal such as a smartphone or a tablet as described above.

Note that, although the description is omitted, it is assumed that information processing apparatus 100 illustrated in FIG. 4 includes hardware illustrated in FIG. 2 as in Embodiment 1, so that the following functions are realized.

As illustrated in FIG. 4, information processing apparatus 100 includes determiner 120, controller 130, communicator 140, and notifier 150.

Communicator 140 is a communication device performing radio communication with vehicle 1.

Specifically, for example, when vehicle 1 starts to be parked in the parking space (more specifically, when the operation for execution direction of automatic parking is performed), communicator 140 receives the present detection object information and the past detection object information.

The detection object information received by communicator 140 is used for the processing by determiner 120 as in Embodiment 1.

Notifier 150 is an output device that calls for attention from the user of vehicle 1 when an object is present around vehicle 1, similarly to notifier 300 described in Embodiment 1.

In the present embodiment, notifier 150 is assumed to be a speaker provided in a mobile terminal. Further, in the present embodiment, the notification is assumed to be the output of an alarm.

The volume of the alarm output from notifier 150 is controlled by controller 130 as in Embodiment 1.

The exemplary configuration of information processing apparatus 100 and vehicle 1 according to Embodiment 2 has been described above.

Figure 5:
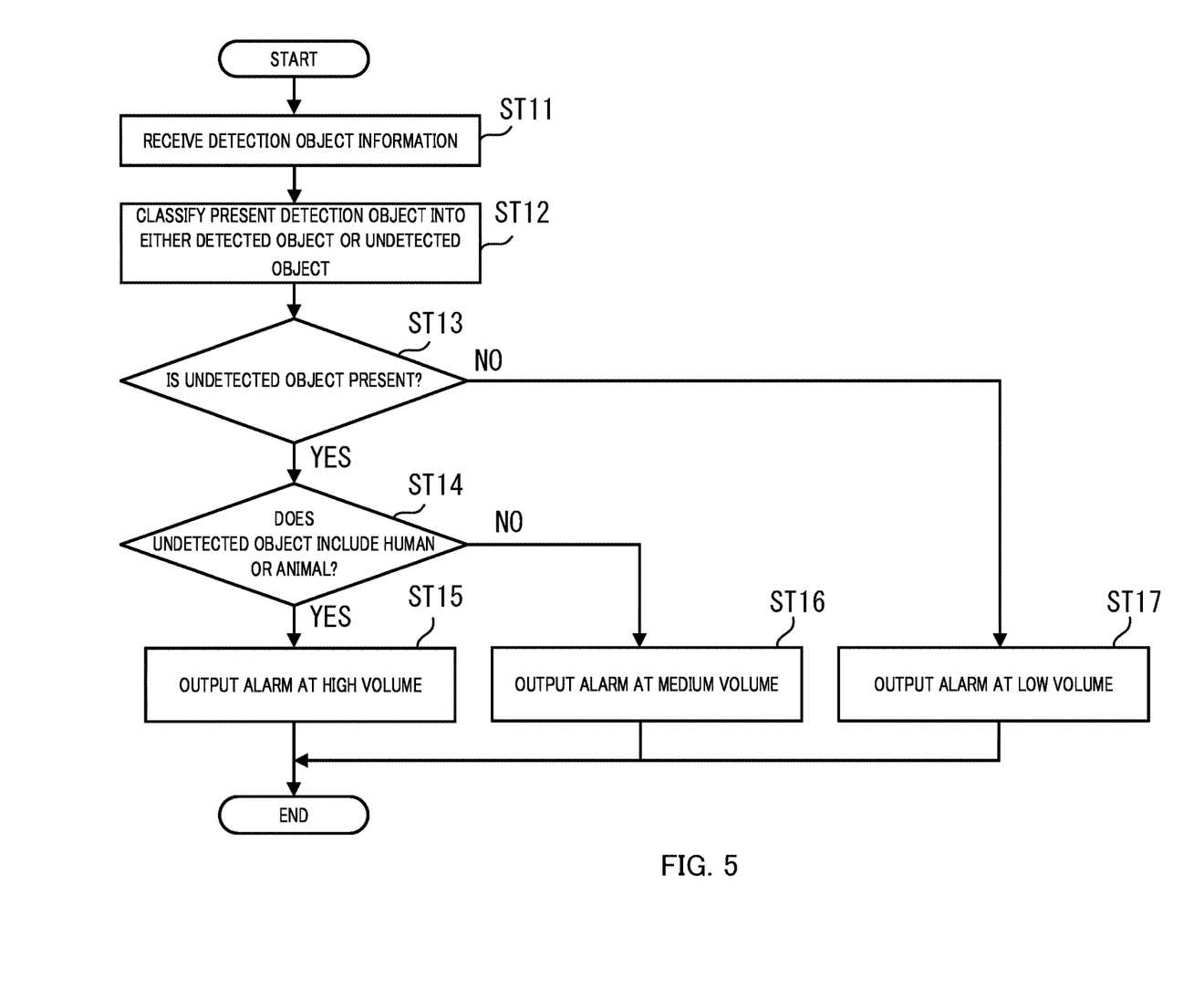
FIG. 5 is a flowchart illustrating an exemplary operation of the information processing apparatus according to Embodiment 2 of the present disclosure.

Next, an exemplary operation of information processing apparatus 100 according to Embodiment 2 will be described with reference to FIG. 5. FIG. 5 is a flowchart illustrating an exemplary operation of information processing apparatus 100 according to Embodiment 2.

The flowchart illustrated in FIG. 5 starts when vehicle 1 is present in a predetermined position around the parking space and the operation for execution direction of automatic parking is performed by the user of vehicle 1. Note that the user may be inside vehicle 1 or outside vehicle 1 while the automatic parking of vehicle 1 is performed.

Although not illustrated, when the execution direction of automatic parking is performed, communicator 400 illustrated in FIG. 4 transmits the present detection object information and the past detection object information to information processing apparatus 100.

First, communicator 140 receives the present detection object information and the past detection object information transmitted from communicator 400 (step ST11).

Next, determiner 120 classifies the present detection object into either a detected object or an undetected object based on the present detection object information and the past detection object information (step ST12).

Next, determiner 120 determines whether an undetected object is present around the parking space based on the classification result (step ST13).

When no undetected object is present around the parking space (step ST13: NO), controller 130 causes notifier 150 to output an alarm at a low volume (step ST17).

When an undetected object is present around the parking space (step ST13: YES), determiner 120 determines whether the undetected object includes a human or an animal (step ST14).

When the undetected object includes a human or an animal (step ST14: YES), controller 130 causes notifier 150 to output an alarm at a high volume (step ST15).

When the undetected object includes no human or animal (step ST14: NO), controller 130 causes notifier 150 to output an alarm at a medium volume (step ST16).

The exemplary operation of information processing apparatus 100 according to Embodiment 2 has been described above.

<Effects>

Information processing apparatus 100 according to Embodiments 1 and 2 is information processing apparatus 100 performing notification to a user of vehicle 1 when an object is present around a parking space, and includes: a storage that stores first detection object information (past detection object information) around the parking space in a first (past) parking; an acquirer that acquires second detection object information (present detection object information) around the parking space in a second (present) parking performed after the first parking; determiner 120 that determines whether an undetected object that has not been detected in the first parking is present, based on the first detection object information and the second detection object information; and controller 130 that changes an aspect of the notification when the undetected object is present.

According to this feature, when the danger level is likely to be higher than that in the past parking, the notification is changed to a notification of an aspect in which the degree of attention calling is greater, so that the user can easily notice the notification, which enhances safety.

That is, information processing apparatus 100 according to Embodiments 1 and 2 can further enhance the notification to the user when the vehicle is parked.

Further, in information processing apparatus 100 according to Embodiments 1 and 2, when no undetected object is present, the notification is performed in an aspect in which the degree of the attention calling is less than that in the case where un undetected object is present, so that the trouble for the user is reduced and the convenience can be enhanced.

Further, in a home zone parking assistance, the vehicle travels on a route when the user has manually driven the vehicle. Furthermore, in the home zone parking assistance, because the vehicle travels on a route on which the vehicle has traveled without colliding with an object when manually driven, the vehicle does not collide with the detected object. Thus, excessive attention calling to the detected object troubles the user. On the other hand, the undetected object possibly collides even in the home zone parking assistance; therefore, attention calling can enhance safety.

<Variations>

Above-described Embodiments 1 and 2 merely describe examples of implementations for practicing the present disclosure, and should not be construed as limiting the technical scope of the present disclosure. That is, the present disclosure can be implemented in various forms without departing from the scope, or essential features thereof.

Variations applicable to Embodiments 1 and 2 will be described below.

[Variation 1]

In Embodiments 1 and 2, the case where vehicle 1 performs automatic parking has been exemplarily described, but the present disclosure may be applied to a case where parking by manual driving is performed.

In this case, the flowchart illustrated in FIGS. 3 and 5 may start when, for example, vehicle 1 is in a predetermined position around the parking space and the user of vehicle 1 performs the operation to move vehicle 1 backward.

[Variation 2]

In Embodiments 1 and 2, the case where storage 110 accumulates a plurality of pieces of past detection information has been exemplarily described, but the present disclosure is not limited thereto.

For example, the past detection object information may be only detection object information indicating the detection result of the previous (latest) parking. However, it is preferred to use a plurality of pieces of past detection object information because the accuracy of the processing performed by determiner 120 increases.

[Variation 3]

In Embodiments 1 and 2, the case where an aspect of the notification is a volume of the output alarm has been exemplarily described, but the aspect may be the length of the output alarm.

For example, when determiner 120 determines that no undetected object is present, controller 130 causes notifier 300 (or notifier 150; the same applies hereinafter) to continually output the alarm of the third length (an example of the third aspect).

Further, for example, when determiner 120 determines that an undetected object is present and the undetected object includes no human or animal, controller 130 causes notifier 300 to continually output an alarm of the second length (an example of the second aspect) that is longer than the third length.

Further, for example, when determiner 120 determines that an undetected object is present and the undetected object includes a human or an animal, controller 130 causes notifier 300 to continually output an alarm of the first length (an example of the first aspect) that is longer than the second length.

The degree of the attention calling increases in the order of the third length, the second length, and the first length.

Note that the length of the alarm described in this variation and the volume of the alarm described in Embodiments 1 and 2 may be combined. That is, the aspect of the notification may be the first length and a high volume, the second length and a medium volume, and the third length and a low volume.

[Variation 4]

In Embodiments 1 and 2, the case where the notification is the output of the alarm has been exemplarily described, but the notification may be display of an image. In this case, notifier 300 may be, for example, a display of a car navigation system. Further, notifier 150 may be, for example, a display of a mobile terminal.

For example, when determiner 120 determines that no undetected object is present, controller 130 causes notifier 300 (or notifier 150; the same applies hereinafter) to display the third image (an example of the third aspect).

Further, for example, when determiner 120 determines that an undetected object is present and the undetected object includes no human or animal, controller 130 causes notifier 300 to display the second image (an example of the second aspect) different from the third image.

Further, for example, when determiner 120 determines that an undetected object is present and the undetected object includes a human or an animal, controller 130 causes notifier 300 to display the first image (an example of the first aspect) different from the third image and the second image.

The degree of the attention calling increases in the order of the third image, the second image, and the first image. The third image may be, for example, an image indicating the presence of an object that has been detected in the past with a character, a picture, or the like. The second image may be an image indicating the presence of an undetected object with a character, a picture, or the like. The first image may be an image indicating the presence of a human or an animal with a character, a picture, or the like.

Further, for example, the third image may be a green-based image, the second image may be a yellow-based image, and the first image may be a red-based image. In addition, at least one of saturation, brightness, and luminance may be different in each image. Furthermore, in a case where an undetected object is surrounded by a frame and the frame is superimposed in an overhead image, a front image, or a rear image, the frame of the undetected object may be displayed in a color different from the frame of the detected object. Alternatively, the detected object need not be surrounded by a frame, and the undetected object may be surrounded by a frame to be highlighted.

In addition, in a case where a virtual wall is superimposed and displayed in front of the undetected object in the overhead image, the front image, or the rear image, the frame of the undetected object may be displayed in a color different from that of the frame of the detected object. Alternatively, the detected object need not be surrounded by a frame, and the undetected object may be surrounded by a frame to be highlighted.

Note that the aspect of the present variation may be not only the type of the displayed image but also a display pattern of the image. For example, controller 130 may cause notifier 300 to display the first image, blinking the first image at high speed, cause notifier 300 to display the second image, slowly blinking the second image, and cause notifier 300 to display the third image without blinking.

[Variation 5]

In Embodiments 1 and 2, the case where the notification is the output of the alarm has been exemplarily described, but the notification may be vibration of equipment or a device touched by the user. In this case, notifier 300 may be, for example, a steering wheel gripped by the user or a seat seated by the user. Further, notifier 150 may be, for example, a vibration function of the mobile terminal.

For example, when determiner 120 determines that no undetected object is present, controller 130 vibrates notifier 300 (or notifier 150; the same applies hereinafter) with the third intensity (an example of the third aspect).

Further, for example, when determiner 120 determines that an undetected object is present and the undetected object includes no human or animal, controller 130 vibrates notifier 300 with the second intensity greater than the third intensity (an example of the second aspect).

Further, for example, when determiner 120 determines that an undetected object is present and the undetected object includes a human or an animal, controller 130 vibrates notifier 300 with the first intensity (an example of the first aspect) greater than the second intensity.

The degree of the attention calling increases in the order of the third intensity, the second intensity, and the first intensity.

[Variation 6]

In Embodiments 1 and 2, when determiner 120 determines that an undetected object is present (including a case where the undetected object includes a human or an animal), controller 130 may cause notifier 300 (e.g., a display of a car navigation system) or notifier 150 (e.g., a display of a mobile terminal) to display an image indicating the position of the undetected object with respect to the position of vehicle 1, in addition to the output of the alarm. At this time, controller 130 may display the distance from vehicle 1 to the undetected object in the image.

This allows the user of vehicle 1 to easily know the positional relationship between vehicle 1 and the undetected object, and thus the safety can be further enhanced.

[Variation 7]

In Embodiments 1 and 2, when determiners 120 determines that no undetected object is present, controller 130 may set the alert distance short instead of outputting the alarm at a low volume. The alert distance is a distance between vehicle 1 by which the output of the alarm is started and the detected object.

This delays the timing at which the alarm is output, so that the trouble for the user can be reduced.

[Variation 8]

In Embodiments 1 and 2, when determiner 120 determines that an undetected object is present, controller 130 may transmit a direction to reduce the speed of vehicle 1 (including the direction to set the vehicle speed to zero) to a driving system (not illustrated) of vehicle 1, in addition to the output of the alarm.

This makes it possible to reduce the probability that vehicle 1 comes into contact with the undetected object, which further enhances the safety.

[Variation 9]

In Embodiments 1 and 2, vehicle 1 may include a determiner (different from determiner 120 illustrated in FIGS. 1 and 5) that determines whether vehicle 1 is around the parking space.

The method of determining whether vehicle 1 is around the parking space may be a method of comparing the position information obtained by an in-vehicle Global Positioning System (GPS) receiver and the preset position information around the parking space, may be a method of comparing (e.g., comparing the extracted feature points of) the captured image of an in-vehicle camera and the preset image around the parking space, or may be a combination of these two methods.

[Variation 10]

In Embodiment 2, as illustrated in FIG. 4, the case where determiner 120 is provided in information processing apparatus 100 that is a mobile terminal has been exemplarily described, but determiner 120 may be provided outside the mobile terminal.

Figure 6:
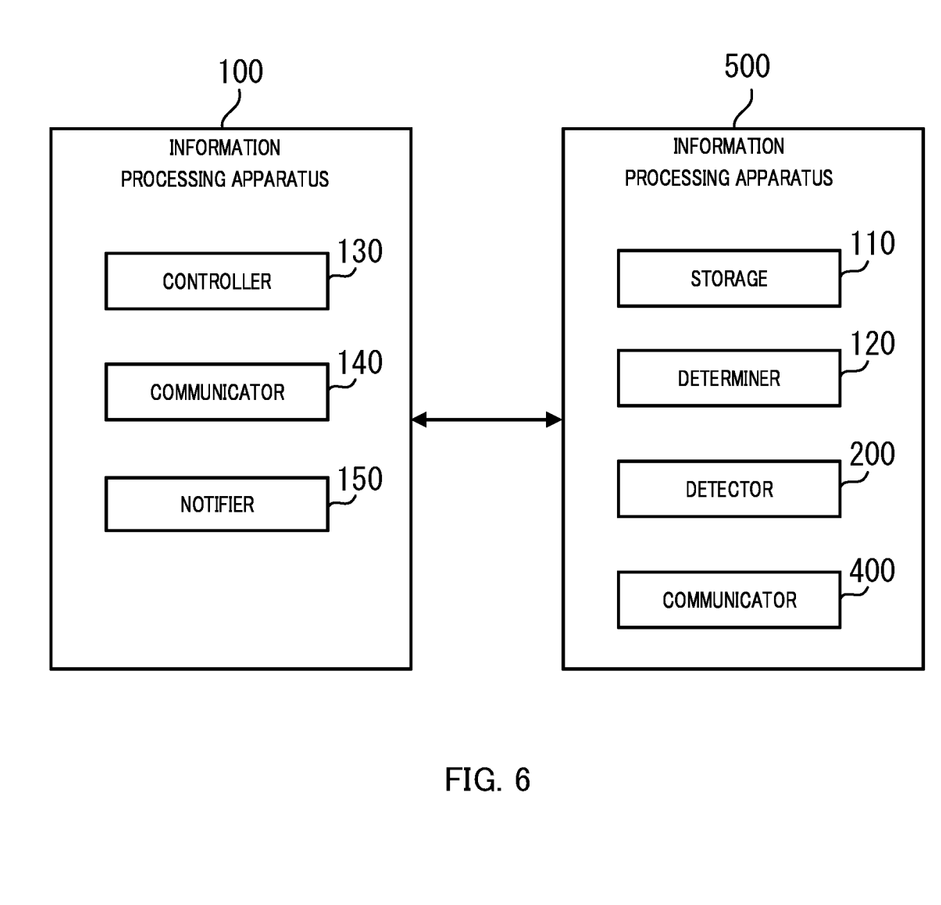
FIG. 6 is a block diagram illustrating an exemplary configuration of an information processing apparatus according to Variation 10 of the present disclosure.

The specific example will be described below with reference to FIG. 6. FIG. 6 is a block diagram illustrating an exemplary configuration of information processing apparatuses 100 and 500 according to the present variation. Note that, in FIG. 6, the same components as those in FIGS. 1 and 4 are denoted by the same reference numerals. Descriptions of these components are omitted as appropriate.

Information processing apparatus 100 illustrated in FIG. 6 is the same as that in Embodiment 2 except that determiner 120 is omitted from the configuration illustrated in FIG. 4.

Information processing apparatus 500 illustrated in FIG. 6 is, for example, an apparatus mounted in vehicle 1. As illustrated in FIG. 6, information processing apparatus 500 includes storage 110, determiner 120, detector 200, and communicator 400. Note that detector 200 need not be included in information processing apparatus 500 (however, is mounted in vehicle 1).

In the present variation, communicator 400 transmits change information for changing the aspect of the notification in information processing apparatus 100 to information processing apparatus 100 when determiner 120 determines that an undetected object is present.

For example, when the undetected object includes a human or an animal, communicator 400 transmits the first change information to information processing apparatus 100. In information processing apparatus 100, when communicator 140 receives the first change information, controller 130 causes notifier 150 to perform notification in the first aspect (e.g., output of an alarm at a high volume).

Further, for example, when the undetected object includes no human or animal, communicator 400 transmits the second change information to information processing apparatus 100. In information processing apparatus 100, when communicator 140 receives the second change information, controller 130 causes notifier 150 to perform notification in the second aspect (e.g., output of an alarm at a medium volume).

Further, for example, when no undetected object is present, communicator 400 transmits the third change information to information processing apparatus 100. In information processing apparatus 100, when communicator 140 receives the third change information, controller 130 causes notifier 150 to perform notification in the third aspect (e.g., output of an alarm at a low volume).

Note that this variation may be combined with Variation 8 described above. Specifically, information processing apparatus 500 illustrated in FIG. 6 may include a controller that transmits a direction to reduce the speed of vehicle 1 (including the direction to set the vehicle speed to zero) to a driving system (not illustrated) of vehicle 1 in addition to the execution of the notification (e.g., output of an alarm) when the undetected object is present.

[Variation 11]

In Embodiments 1 and 2, the case where detector 200 is an in-vehicle sensor has been exemplarily described, but the present disclosure is not limited thereto.

For example, detector 200 may be an external sensor that is provided in or near the parking space and is capable of performing short-range radio communication with a communication device (e.g., communicator 400 illustrated in FIG. 4) mounted in vehicle 1.

In this case, a communication apparatus of vehicle 1 may receive the present detection object information from the external sensor when vehicle 1 reaches a predetermined position around the parking space.

The variations have been described thus far. The above-described variations may be combined as appropriate.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2022-110554, filed on Jul. 8, 2022, the disclosure of which including the specification, drawings and abstract is incorporated herein by reference in its entirety.

INDUSTRIAL APPLICABILITY

The information processing apparatus and the information processing method of the present disclosure are useful for a technique for assisting vehicle parking.

The invention claimed is:

1. An information processing apparatus performing notification to a user of a vehicle when an object is detected around a parking space, the information processing apparatus comprising:
   a storage that stores first detection object information around the parking space in a first parking; and
   a processor that acquires second detection object information around the parking space in a second parking performed after the first parking, wherein the first parking is performed by manual driving, the second parking is performed by automatic parking based on the first parking, and the processor determines whether an undetected object that was not detected in the first parking is detected in the second parking, based on the first detection object information and the second detection object information, and changes an aspect of the notification when the undetected object, that was not detected during the first parking performed by the manual driving, is detected in the second parking performed by the automatic parking.

2. The information processing apparatus according to claim 1, wherein the processor changes the aspect of the notification to a second aspect different from a first aspect of the notification when the undetected object is detected.

3. The information processing apparatus according to claim 1, wherein the processor determines whether the undetected object includes a human or an animal when the undetected object is detected, executes the notification in a first aspect when the undetected object includes the human or the animal, and executes the notification in a second aspect when the undetected object does not include the human or the animal, wherein the first aspect includes a degree of calling for attention from the user that is greater than that in the second aspect.

4. The information processing apparatus according to claim 3, wherein the processor executes the notification in a third aspect in which the degree of calling for attention from the user is less than that in the second aspect when the undetected object is not detected in the second parking.

5. The information processing apparatus according to claim 1, wherein the notification is output of a sound, and the aspect is a volume of the sound.

6. The information processing apparatus according to claim 1, wherein the notification is display of an image, and the aspect is a type of the image.

7. The information processing apparatus according to claim 1, wherein the notification is vibration of equipment touched by the user, and the aspect is an intensity of the vibration.

8. The information processing apparatus according to claim 1, wherein the processor performs control for reducing a speed of the vehicle when the undetected object is detected in the second parking.

9. The information processing apparatus according to claim 1, wherein the information processing apparatus is an apparatus mounted in the vehicle.

10. The information processing apparatus according to claim 1, wherein the information processing apparatus is a mobile terminal used by the user of the vehicle.

11. An information processing apparatus that communicates with a mobile terminal that performs notification to a user of a vehicle when an object is detected around a parking space, the information processing apparatus comprising:

a storage that stores first detection object information around the parking space in a first parking; and a processor that acquires second detection object information around the parking space in a second parking performed after the first parking, wherein the first parking is performed by manual driving, the second parking is performed by automatic parking based on the first parking, the processor determines whether an undetected object that was not detected in the first parking is detected in the second parking, based on the first detection object information and the second detection object information, and the information processing apparatus causes the mobile terminal to change an aspect of the notification when the undetected object, that was not detected during the first parking performed by the manual driving, is detected in the second parking performed by the automatic parking.

12. The information processing apparatus according to claim 11, wherein the information processing apparatus transmits, to the mobile terminal, change information for changing, in the mobile terminal, the aspect of the notification to a second aspect different from a first aspect of the notification, when the undetected object is detected.

13. The information processing apparatus according to claim 11, wherein the processor determines whether the undetected object includes a human or an animal when the undetected object is detected, the information processing apparatus transmits, to the mobile terminal, first change information for executing the notification in a first aspect when the undetected object includes the human or the animal, and transmits, to the mobile terminal, second change information for executing the notification in a second aspect when the undetected object does not include the human or the animal, and the first aspect includes a degree of calling for attention from the user that is greater than that in the second aspect.

14. The information processing apparatus according to claim 13, wherein the information processing apparatus transmits, to the mobile terminal, third change information for executing the notification in a third aspect in which the degree of calling for attention from the user is less than that in the second aspect, when the undetected object is not detected in the second parking.

15. The information processing apparatus according to claim 11, wherein the notification is output of a sound, and the aspect is a volume of the sound.

16. The information processing apparatus according to claim 11, wherein the notification is display of an image, and the aspect is a type of the image.

17. The information processing apparatus according to claim 11, wherein the notification is vibration of equipment touched by the user, and the aspect is an intensity of the vibration.

18. The information processing apparatus according to claim 11, wherein
the processor performs control for reducing a speed of the vehicle when the undetected object is detected in the second parking.

19. The information processing apparatus according to claim 11, wherein
the information processing apparatus is an apparatus mounted in the vehicle.

20. An information processing method executed by an apparatus that performs notification to a user of a vehicle when an object is detected around a parking space, the information processing method comprising:
storing first detection object information around the parking space in a first parking, the first parking being performed by manual driving;
acquiring second detection object information around the parking space in a second parking performed after the first parking, the second parking being performed by automatic parking based on the first parking;
determining whether an undetected object that was not detected in the first parking is detected in the second parking, based on the first detection object information and the second detection object information; and
changing an aspect of the notification when the undetected object, that was not detected during the first parking performed by the manual driving, is detected in the second parking performed by the automatic parking.

21. An information processing method executed by an apparatus that communicates with a mobile terminal that performs notification to a user of a vehicle when an object is detected around a parking space, the information processing method comprising:
storing first detection object information around the parking space in a first parking, the first parking being performed by manual driving;
acquiring second detection object information around the parking space in a second parking performed after the first parking, the second parking being performed by automatic parking based on the first parking;
determining whether an undetected object that was not detected in the first parking is detected in the second parking, based on the first detection object information and the second detection object information; and
transmitting, to the mobile terminal, information for changing an aspect of the notification performed by the mobile terminal when the undetected object, that was not detected during the first parking performed by the manual driving, is detected in the second parking performed by the automatic parking.

22. An information processing apparatus performing notification to a user of a vehicle when an object is detected around a parking space, the information processing apparatus comprising:
a storage that stores first detection object information around the parking space in a first parking; and
a processor that acquires second detection object information around the parking space in a second parking performed after the first parking, wherein
the first parking is performed by manual driving,
the second parking is performed by automatic parking based on the first parking, and
the processor
changes an aspect of the notification when an undetected object, that was not detected during the first parking performed by the manual driving, is detected in the second parking performed by the automatic parking.

* * * * *